No. 830,488. PATENTED SEPT. 11, 1906.
N. BECKWITH.
WHEEL TIRE.
APPLICATION FILED JULY 25, 1904.
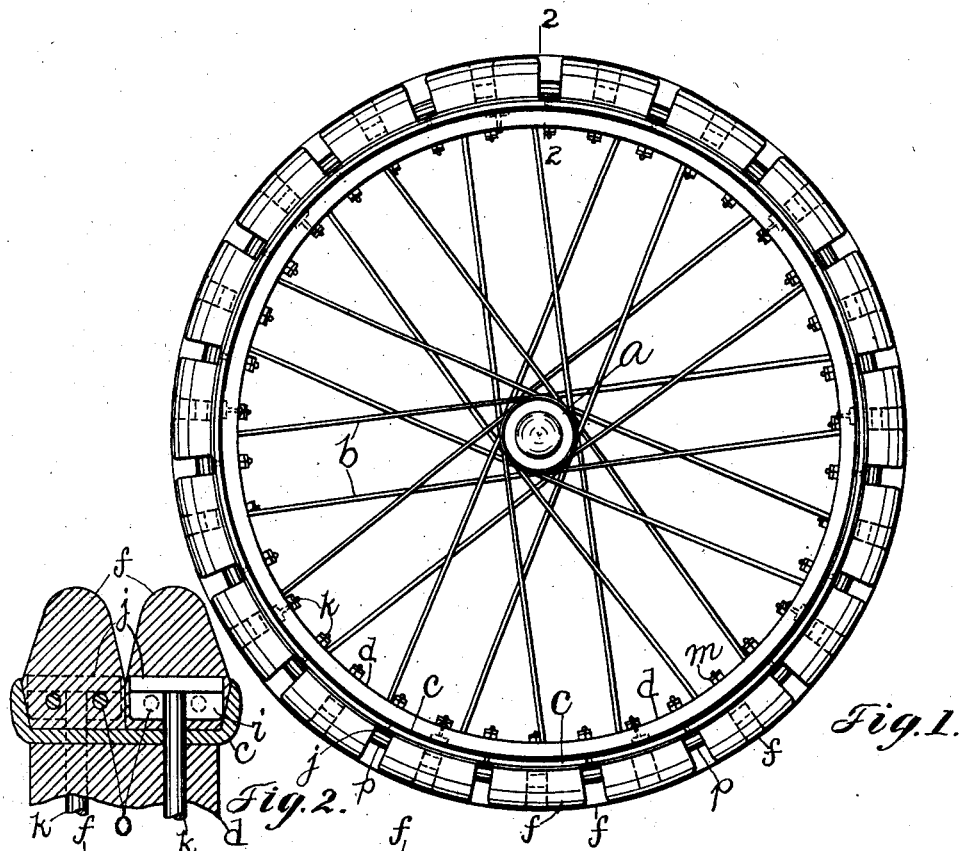
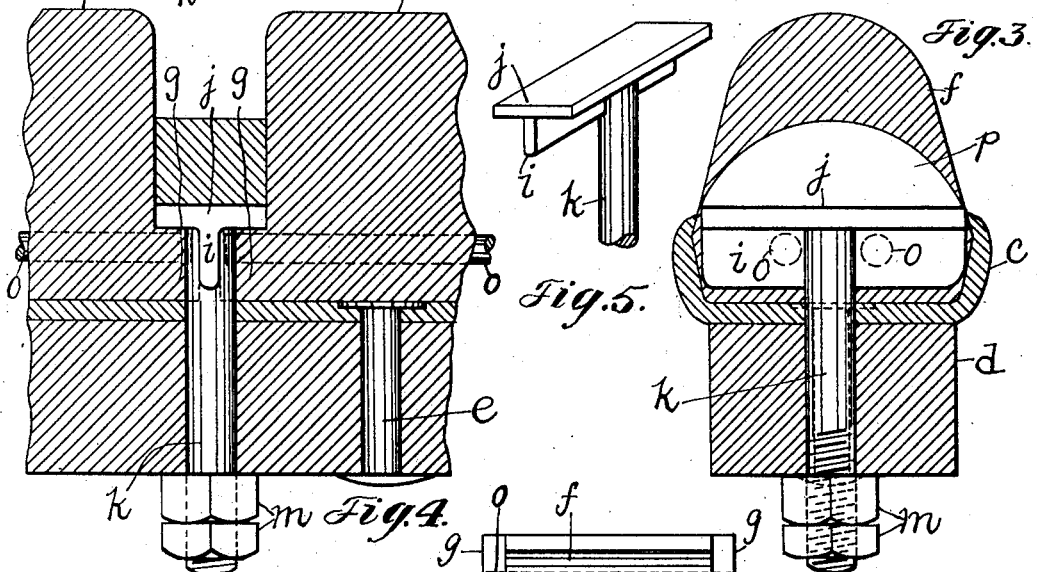

UNITED STATES PATENT OFFICE.

NELSON BECKWITH, OF SOMERVILLE, MASSACHUSETTS.

WHEEL-TIRE.

No. 830,488.  Specification of Letters Patent.  Patented Sept. 11, 1906.

Application filed July 25, 1904. Serial No. 217,957.

*To all whom it may concern:*

Be it known that I, NELSON BECKWITH, a citizen of the United States, residing in Somerville, in the county of Middlesex and State of Massachusetts, have invented an Improvement in Wheels, of which the following description, in connection with the accompanying drawings, is a specification, like letters on the drawings representing like parts.

This invention relates to a wheel of novel construction which is especially designed and adapted for use on motor-vehicles.

In accordance with this invention the wheel is provided with one or more tires, each composed of sections of yielding material, preferably rubber, which are clamped to the rim of the wheel in a novel manner, as will be described. The sections of the tire may and preferably will be provided with one or more reinforcing bars or rods, extended longitudinally of the sections and coöperating with the devices employed to clamp the sections to the tire to prevent creeping of the tire-sections, as will be described. Provision is also made to prevent stones becoming wedged between the sections of the tire, as will be described. These and other features of this invention will be pointed out in the claims at the end of this specification.

Figure 1 is a side elevation of a wheel embodying this invention; Fig. 2, a detail in section of the wheel shown in Fig. 1; Fig. 3, a cross-section of a wheel provided with a single tire embodying this invention; Fig. 4, a longitudinal section of the single tire shown in Fig. 3; Fig. 5, a detail of the preferred form of clamping device, and Fig. 6 a plan of one of the tire-sections removed from the wheel.

In the present instance I have shown the invention as embodied in a wheel especially designed and adapted for use on automobiles and in which the hub $a$, spokes $b$, and rim, comprising the parts $c$ $b$, are and may be of any usual or suitable construction. The part $c$ is and may be made as a channel-iron and is secured to the part $d$, which may be of wood, by rivets $e$. In accordance with this invention the wheel is provided with one or more tires, each composed of sections $f$ of yielding material, preferably rubber, and each section may and preferably will be provided with a body portion, from which project at the opposite ends thereof lips or extensions $g$, with which coöperate clamping devices by which the yielding sections of the tire may be firmly secured to the rim of the wheel.

I may prefer to employ a clamping device of the construction herein shown, (see Fig. 5,) it consisting of a substantially T-shaped head comprising a central vertical web $i$ and a substantially horizontal piece $j$, which projects beyond the opposite sides of the web $i$ to form flanges, which are adapted to engage the upper surface of the lips $g$ on adjacent tire-sections, as represented in Fig. 2.

The clamping device is provided with a stem or rod $k$, which is designed to extend down through the rim of the wheel and is threaded at its end to receive one or more nuts $m$, by means of which the clamping device may be drawn into firm engagement with the lips $g$ of adjacent tire-sections, and thereby firmly clamp adjacent sections of the tire to the rim of the wheel. The stem or rod $k$ projects beyond the web $i$, and in order to permit the ends of the lips $g$ on the tire-sections to abut against the said web the said lips are provided with a recess $n$, (see Fig. 6,) which conforms to the shape of the stem or rod $k$.

The tire-sections $f$ may and preferably will be reinforced by one or more metal rods $o$, which may extend entirely through the said section; but I prefer to have the reinforcing-rods a little shorter than the length of the tire-sections through the lips $g$, so that the ends of the rods may be covered, as represented in Figs. 4 and 6, in which case it will be noticed that a thin cushion is interposed between the metal web $i$ and the metal rods $o$, while the rods are yet sufficiently close to the clamping device to prevent any extended movement of the tire-section on the rim of the wheel.

In Figs. 1 and 2 I have shown the wheel as provided with two tires of the construction above described, the sections of one tire being arranged so as to break joints with the sections of the other tire. A wheel having a plurality of tires of the construction above described and arranged so that the sections of one tire break joints with the sections of the other tire is especially advantageous for use on heavy vehicles, inasmuch as the traction is increased as a section of one tire is gripping when the end of a section on the other tire is being compressed. So, also, the two tires being separated prevent lateral movement or sluing of the vehicle.

When the wheel is to be used on a lighter vehicle, such as an automobile for pleasure purposes or for light work, a single tire may be used, as represented in Fig. 3.

By reference to the drawings it will be seen that the sections of the tire are firmly clamped to the rim of the wheel and while offering increased traction do so without movement of the tire on the rim of the wheel. It will also be seen that, if desired, any section of the tire can be quickly removed and replaced by a new section in a substantially short time, it being only necessary to unscrew the nuts $m$ and remove the clamping devices at the opposite ends of the section to be removed. I may prefer to make the lips $g$ pronounced and to shape the body portion of the tire-section so as to leave a clear space between adjacent sections, as shown, and when so constructed provision may be made to prevent stones from being picked up and wedged between the tire-sections. For this purpose I prefer to partially fill the space between adjacent tire-sections by a block or piece $p$ of rubber or other suitable material, which may be curved on its outer surface, as shown in Fig. 3, and which may be vulcanized, riveted, or otherwise secured to the top piece of the clamping device.

I claim—

1. The combination with a wheel, of a tire composed of sections of yielding material having lips projecting from the opposite ends thereof, clamping devices interposed between said sections and comprising a rod or stem, a web interposed between said lips and against which said lips abut and side flanges projecting from said web to engage the upper face of said lips, and means engaging said stem or rod to secure said clamping devices to said wheel, substantially as described.

2. The combination with a wheel, of a tire composed of sections of yielding material having lips or projections, reinforcing-rods extended longitudinally of said sections, clamping devices interposed between adjacent sections and comprising a rod or stem, a web interposed between said lips in line with said rods and side flanges extended over and engaging the upper surface of said lips, and means to secure said clamping devices to said wheel, substantially as described.

3. The combination with a wheel, of a tire composed of sections of yielding material having lips or projections, clamping devices interposed between adjacent sections and engaging said lips and provided with devices of a length substantially equal to the width of a tire-section and which are interposed between the lips of adjacent sections to separate the same and to lock said sections against circumferential movement, and means to secure said clamping devices to said wheel, substantially as described.

4. The combination with a wheel, of a tire composed of sections of yielding material, substantially T-shaped clamping devices having their heads extended transversely of said sections and interposed between adjacent sections to separate the same, and means to secure said devices to said wheel, substantially as described.

5. The combination with a wheel, of a tire composed of sections of yielding material, a reinforcing-rod extended through each section, clamping devices interposed between said sections and in engagement therewith to secure said sections to said wheel, said clamping devices having a portion extended transversely of the wheel which is interposed between and in line with the reinforcing-rods of adjacent sections, substantially as described.

6. The combination with a wheel, of a plurality of tires, each composed of independent sections separated from one another at their outer circumference and provided with lips at their ends, the sections of one tire being arranged to break joints with the sections of another tire so that a solid portion of a section of one tire is opposite the space between adjacent sections of the other tire, and clamping devices to engage said lips and detachably secure said sections to said wheel, substantially as described.

7. The combination with a wheel, of a plurality of tires provided with sections, separated from one another at their outer circumferences, the sections of one tire being arranged to break joints with the sections of another tire so that a solid portion of a section of one tire is opposite the space between adjacent sections of the other tire, and means to secure said tires to said wheel, substantially as described.

8. The combination with a wheel, of a tire comprising two or more annular rows of tire-sections, the tire-sections composing each row being arranged around the rim of the wheel and disposed with relation to each other so as to leave a space between each tire-section and the tire-sections adjacent to the ends thereof and disposed in relation to the tire-sections in the next row thereto so that each tire-section will overlap two tire-sections in the row next to it, a clamping device arranged in the spaces between the tire-sections in each annular row, means for forming an operative connection between said tire-sections and said clamping devices and means for securing said clamping devices on the rim of the wheel, substantially as described and for the purpose set forth.

In testimony whereof I have signed my name to this specification in the presence of two subscribing witnesses.

NELSON BECKWITH.

Witnesses:
Jas. H. Churchill,
J. Murphy.